INVENTOR:
RUDOLPH F. ONSRUD
BY
ATT'YS

June 4, 1957 R. F. ONSRUD 2,794,370
CONTOUR MILLING MACHINE
Filed June 8, 1954 4 Sheets-Sheet 3

INVENTOR:
RUDOLPH F. ONSRUD
BY
ATT'YS

*INVENTOR:*
RUDOLPH F. ONSRUD
BY

ATT'YS

United States Patent Office 2,794,370
Patented June 4, 1957

2,794,370

CONTOUR MILLING MACHINE

Rudolph F. Onsrud, Chicago, Ill., assignor to Onsrud Machine Works, Inc., Chicago, Ill., a corporation of Illinois Application June 8, 1954, Serial No. 435,324

11 Claims. (Cl. 90—13)

This invention relates to automatic contour milling machines, and particularly to such machines as are used for cutting longitudinal contours on spars and other long pieces of work.

In machines of this kind, it is customary to control the movements of the milling cutter by means of a template of the same length as the piece that is worked upon, which template must be secured to the worktable or machine bed by numerous fastenings, and to control the movements of the cutter by means of a follower which bears directly on the pattern or template and is connected for directly shifting the cutter as the work or the cutter is moved, one relative to the other. The disadvantages of such a system reside particularly in the fact that the template must be extremely heavy to carry the load of the cutter drive and the supporting mechanism therefor; the template must be very rigid to minimize deflection; vibrations in the template and its support produce chattering in the cutter-work engagement with a resulting imperfect finish; and the task of setting the template is extremely difficult because of the precision of adjustment required.

The main objects of the present invention are, therefore, to provide an improved form of cutter operating mechanism; to provide an improved form of mechanism for controlling movements of the cutter of a contour milling machine by means other than one actuated by direct engagement of a cutter follower and a template; to provide an improved template construction adapted to be mounted on the cutter carriage or elsewhere remote from the work to provide an improved form of template mechanism; to provide an improved form of template controlled mechanism whereby the movements of the cutter relative to the work are capable of being controlled electronically with greater accuracy and stability; to provide an improved mechanism for positioning the cutter relative to the work; to provide such a mechanism having a fixed rigid base path parallel with the plane of the work and providing a precise plane of reference from which all adjustments of cutter position are made during the shaping operation on the work; and to provide an improved construction of the cutter support whereby cutter position adjustment may be accurately controlled from a fixed base plane by remote controlling means.

A specific embodiment of this invention is shown in the accompanying drawings in which.

Figure 1:
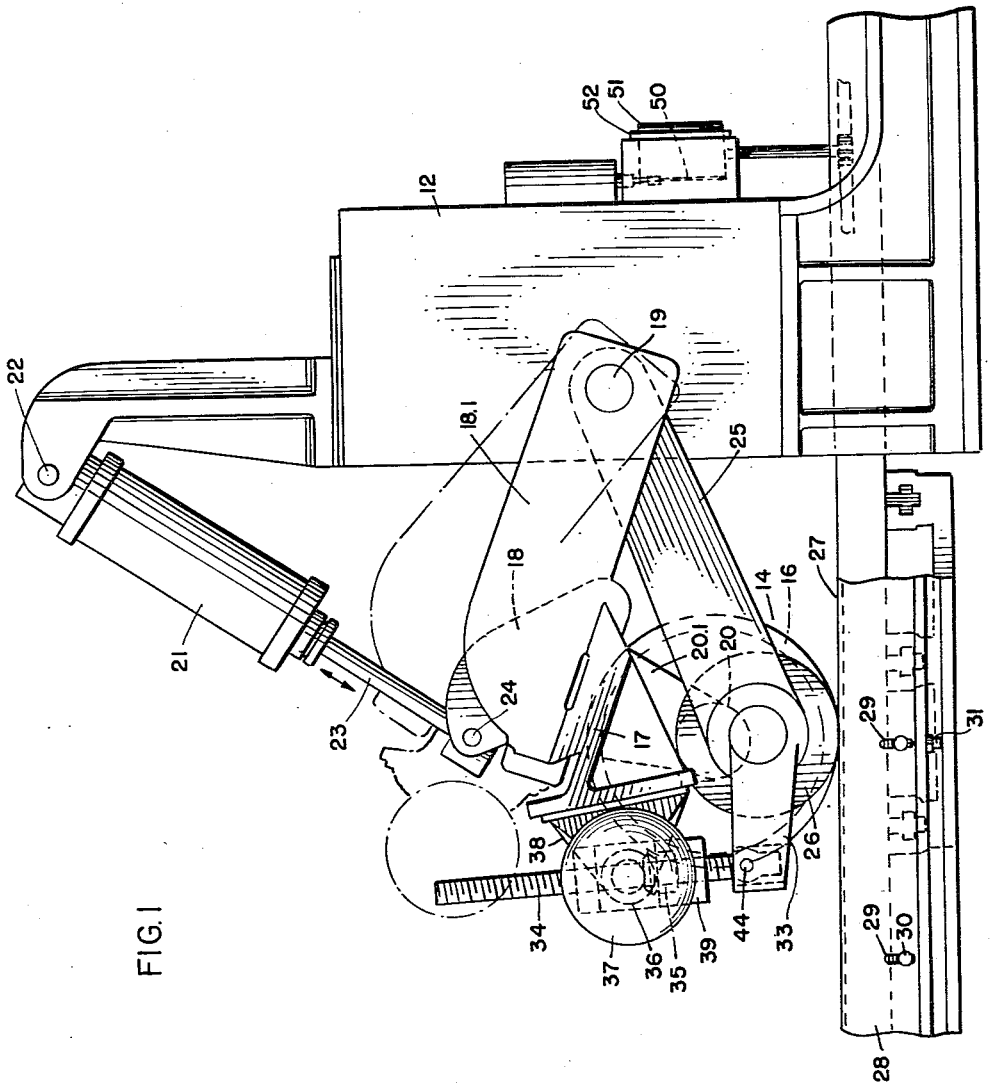
Figure 1 is a fragmentary side elevation of an automatic spar milling machine, showing an improved arrangement of cutting tool-operating mechanism for control in accordance with this invention.

In the drawings, parts of the machine that do not contribute to an understanding of this invention are omitted, and the various views are limited mainly to essential features.

In the form shown in the drawings, the invention is illustrated in the form of parts of a spar milling machine comprising an elongated worktable 10 of suitable form and length for holding a long piece of work, such as a blank for an airplane wing spar. The table 10 is fixedly mounted in the usual manner on the stationary base or bed 11 and a tool support structure or carriage 12 is slidably mounted on said bed for travel above and lengthwise of the table 10.

The particular tool mounting mechanism shown in the drawings is adapted for carrying out this invention with respect to a horizontal cutter. Similar mechanism is used for control of vertical or inclined cutters by appropriate changes in the directions of motion of the parts.

Figure 2:
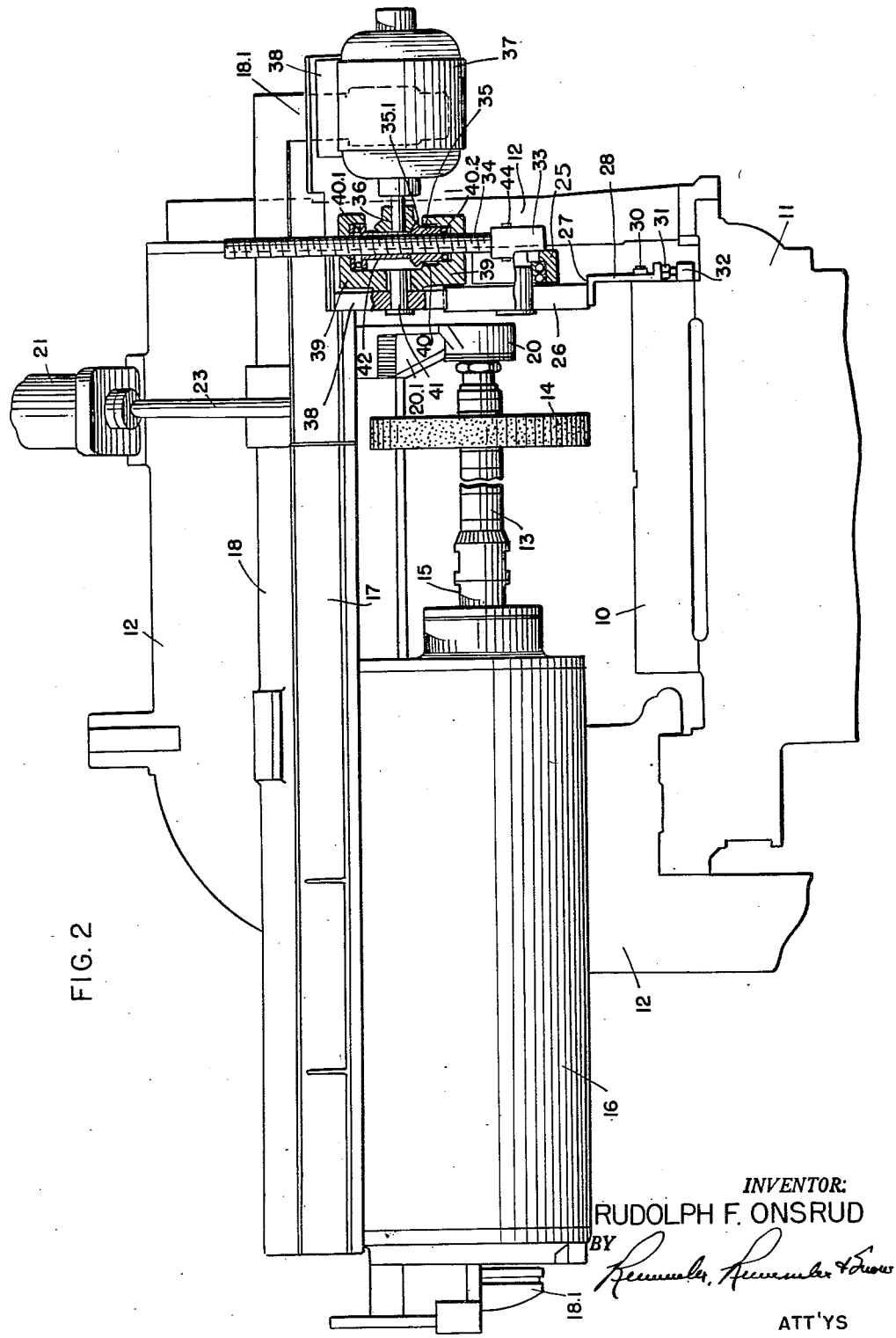
Fig. 2 is an end elevation of the same as viewed from the left of Fig. 1.
Figure 3:
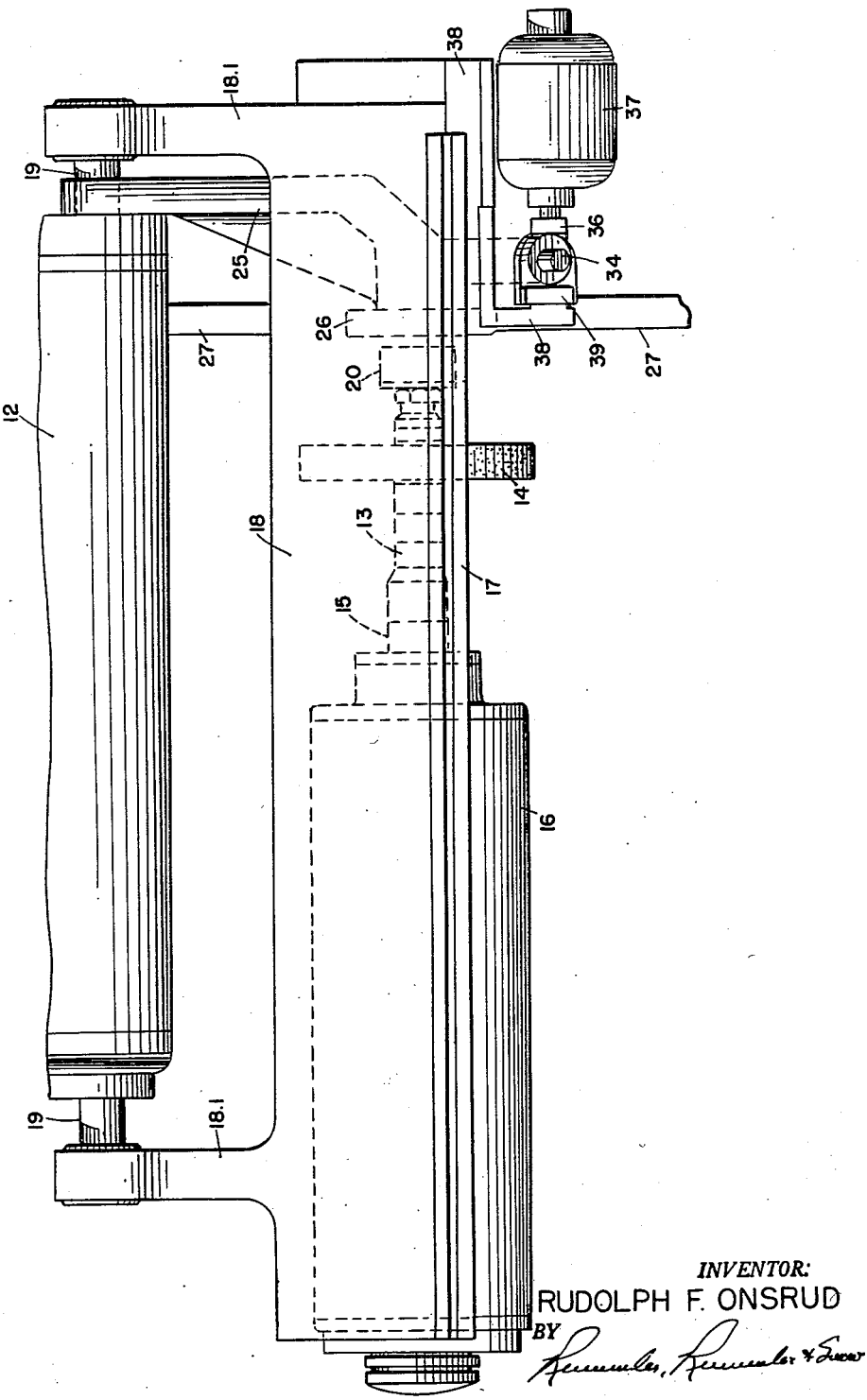
Fig. 3 is a plan view of parts of the same as viewed from the top of Fig. 2.

In Figures 1, 2 and 3 the arbor 13 of the horizontal cutter wheel 14, constitutes an extension of the shaft 15 of the driving motor 16 which is mounted on a slide 17 carried by a vertically movable carrier member 18 of bracket form having arms 18.1 which are pivoted on and swingable vertically about the horizontal axes of the aligned trunnions 19 mounted on opposite sides of the main tool carriage 12. The outboard end of the cutter wheel shaft is supported in a bearing 20 carried by a bracket 20.1 which is also mounted on the slide 17. As shown in Fig. 1, the carrier member 18 is provided with suspension and elevating means comprising a pneumatic or hydraulic cylinder 21, fulcrumed at 22 on the main tool carriage 12, and a piston rod 23, pivotally connected at 24 on the carrier member 18. As will be understood the piston rod 23 is actuated by a piston, not shown, movable axially in the cylinder 21 under the influence of a fluid pressure introduced at opposite ends of the cylinder in the usual manner.

Automatic control of the vertical position of the horizontal cutter 14, relative to the work table 10 and the work thereon, is accomplished, in the device shown, by mechanism comprising a second carrier member for positioning arm 25 swingable about the common axis of the trunnions 19 and having a rotatable follower wheel 26 that bears against and rides on a rigidly mounted horizontal track 27. This track 27 extends along one side of the table 10 throughout the whole length of the table and in the device shown, the top surface of the track on which the wheel roller 26 rides is perfectly level from end to end. The track 27 is the horizontal flange of a rigid angle bar 28 which has regularly spaced slots 29 in its vertical flange at intervals along its length to receive bolts 30 by means of which the track can be accurately adjusted to perfectly level alinement. Set screws 31 bearing between the lower rim or flange of the bar 28 and suitable lugs 32 fixed on the table framework facilitate this accurate leveling of the track 27.

The second carrier or positioning member 25 is in the form of a rigid arm, on which the roller 26 is journalled to ride on the track 27, and has an extension 33 which provides a seat for a jack screw 34 that is part of jack mechanism which connects and adjusts the members 18 and 25 relative to each other to vary their angular relation and thereby adjust the postion of the cutter 14 toward and away from the work which is secured firmly on the work table 10.

As shown in Fig. 2, this jack mechanism comprises the jack screw 34, and a nut 35 having bevel gear teeth 35.1 meshing with mating teeth of bevel gear 36 which in turn is driven by a cutter positioning electric motor 37 carried by a bracket 38 fixed on the carrier member 18. The nut 35 is mounted on the carrier member 18 by a pivoted bearing block 39, which has a bore through which the jack screw 34 extends freely, and this block has mounted therein a journal bearing 40 for the nut 35, and top and bottom thrust bearings 40.1 and 40.2 for the hub ends of the nut 35.

The block 39 is swiveled on a pivot 41 on the bracket 38, which pivot is axially alined with the shaft of the motor 37. This enables the jack screw 34 to tilt freely, to accommodate the angular movement of member 18 relative to the arm 25 upon adjustment of the nut 35 along the screw, without disturbing the operative relation between the gears 35.1 and 36. Also the lower end of screw 34 is pivotally secured on a trunnion pin 44 which extends across a vertical socket near the end of the extension 33 on the arm 25 and on which the end of the screw 34 is tiltably supported. The pin 44 is parallel with the pivot 41 so that the shaft 34 is free to tilt in the plane of the relative angular movements of the carrier members 18 and 25.

In the form shown, the auxiliary arm 25 is stationary relative to the arm 18 when the machine is in operation, the guide roller 26 riding on the track 27, and adjustment of the cutter to effect the desired contour on the formed work piece is accomplished by raising and lowering the main cutter supporting frame 18 through the medium of the jack screw 34, which is mounted on the stationary arm 25, and the nut 35 which is mounted on the relatively movable frame 18 and is adapted to run axially along the jack screw 34. Thus the arms 18.1 and 25, see Fig. 1, have a scissors relation about the common pivot 19 and adjustment of the cutter position is effected by varying the angle between the arms 18.1 and 25 through rotation of the nut 35, in one direction or the other, on the jack screw 34 by means of the motor 37 and the bevel gear 36.

It will now be seen that the particular distinction of the present milling machine construction, over prior devices wherein the position of the cutter relative to the work is determined by a guide roller mounted directly on the cutter supporting frame and bearing against the pre-formed contour of a full scale template, such as is shown in Onsrud Patent 2,345,494, and in the Willem Groen et al. Patent No. 2,451,548, resides in the provision of the auxiliary arm 25 and its guide roller 26 which rides on a rigid perfectly level track or base member 27, and a separate motor driven jack screw connection between the auxiliary arm 25 and the main cutter supporting frame 18, whereby all cutter movements relative to the work are based upon the relatively motionless auxiliary arm 25 rather than physical engagement of a cutter guide roller on the contour of a template or pattern.

Since the track member 27 is perfectly level and smooth, it provides a solid vibrationless base or support for the auxiliary arm 25, and since the cutter position is adjusted from the auxiliary arm, rather than from the contour of a template or pattern, through the medium of a cutter guide roller, the cutter may be held more firmly and accurately engaged with the work, and the possibility of chatter or vibration between the cutter and the work is substantially obviated. Thus the finished surface on the work is not only more accurately formed insofar as contour is concerned, but is also perfectly smooth and wholly devoid of transverse ridges or other imperfections, which are apt to occur with ordinary directly controlled cutter positioning operations.

Normally the hydraulic cylinder 21 and its piston rod 23, which are connected between the main cutter carrier frame 18 and the main tool carriage 12, are used when the machine is not in operation to raise and lower the entire cutter-carrier structure together with the auxiliary arm 25 relative to the work bed to facilitate installation of the work to be shaped, and during the operation of the machine this hydraulic cylinder and piston rod arrangement serves the additional function of carrying a portion of the total weight of the cutter-carrier frame 18 and its associated mechanism, so that only a portion of the vertical load of the same need be supported by the jack screw 34 and the auxiliary arm roller 26 from the base track 27. The division of this load between the hydraulic cylinder 21 and the base track 27 can be accurately controlled by merely adjusting the pressure of the fluid medium acting on the lifting side of the piston within the cylinder 21.

The electric motor 37, which drives the nut 35 along the jack screw 34, and thereby adjusts the position of the main cutter carrier 18 relative to the auxiliary arm 25, is a reversible motor which may be remotely controlled by any suitable electric control mechanism adapted to be operated by a pattern means in accordance with the position of the carrier 12 along the work bed 10. Thus the improved machine is adaptable to regulation by any of the several known electrical control systems whether they be actuated by electronic tracer heads which follow the contour of a pre-formed pattern, or by any other system of remote pattern control.

Figure 4:
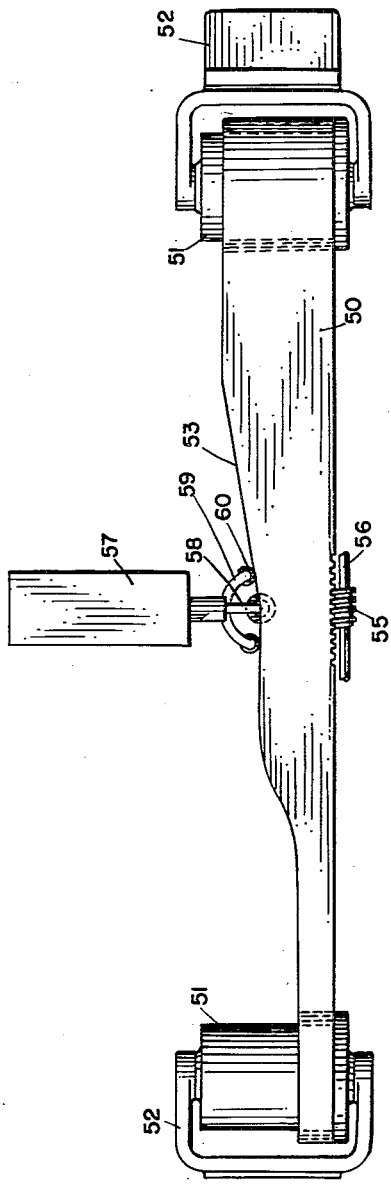
Fig. 4 is a diagrammatic, partly fragmentary, elevation of an improved template arrangement and electronic tracing head, suitable for carrying out the present invention.
Figure 5:
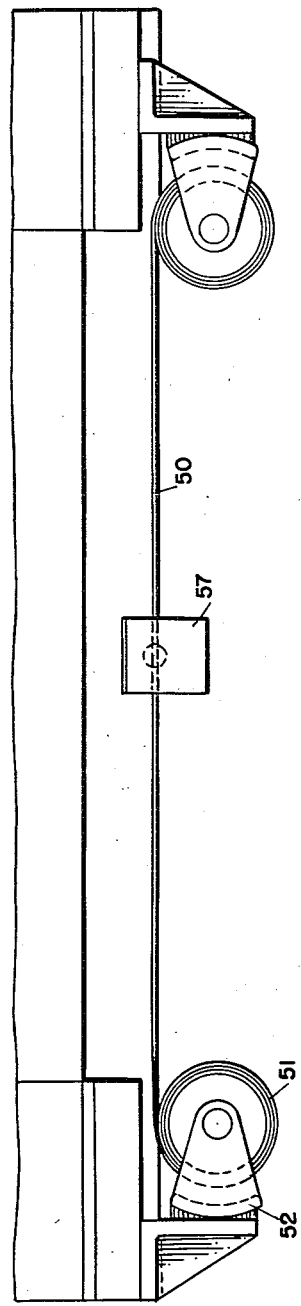
Fig. 5 is a top plan of the same.

In any event the electrical control system for regulating operation of the cutter positioning motor 37 must be correlated with the longitudinal movement of the main carriage 12, relative to the work mounted on the work table 10 of the milling machine. That is, the relative movement of the template or pattern and the electronic pattern follower or tracer head must be directly proportional to the movement of the carriage 12 relative to and along the work, and in the present instance, as shown in Figs. 1, 4 and 5, this correlation of the pattern control system with the movement of the carriage 12 is obtained by driving the control system from the same power system that drives the carriage 12 along the stationary base or bed 11. Thus as shown in Figs. 1 and 5, the control system is mounted directly on the carriage 12 where by any suitable connection, not shown, the drive or movement of the carriage relative to the base can be utilized to operate the pattern control system.

The location of the control system on the carriage 12 may be at any convenient place, and as shown is mounted on the side of the carriage frame opposite the side adjacent the cutter carriage and its associated mechanism. Thus the control system is free and clear of the cutter operating mechanism, and is yet convenient for operation in direct relation to movement of the main carriage 12 relative to the work bed 11.

In the improved milling machine illustrated herein, which is a horizontal spar mill, the adjustments of cutter position relative to the work, are all in vertical plane, and are made with respect to a common horizontal base line which in the present instance may be considered to be the surface of the horizontal base track 27. Thus the pattern or template from which the operation of the cutter positioning motor 37 is to be controlled will be made with a pre-formed contour or profile edge the contour variations of which are accurately scaled and located throughout its length with reference to the length of the work and the rate of relative movement of the pattern and the pattern follower. Therefore, since relative movement of the pattern and the pattern follower, in control systems of this type, is accurately correlated with the relative movement of the carriage frame 12 and the work bed 11, variations in the contour or the profile edge of the pattern, through the medium of a suitable tracer head and electrical motor control means operated thereby will be caused to operate the cutter positioning motor 37 so that the location of the cutter with respect to the surface of the work will be adjusted accordingly.

In the form shown in Fig. 4 the pattern or template mechanism for controlling the movement of the cutter 14 relative to the work, comprises a resiliently flexible tape 50, preferably of sheet metal, carried by a pair of parallel, laterally spaced winding drums 51, journaled on suitable brackets 52, which are rigidly fastened to the carriage structure 12. In this case the pattern or template tape 50 is wound back and forth on the drums 51, so that the template tape is shifted transversely with respect to an electronic tracing head, which engages the pre-formed edge or profile 53 of the pattern tape from a fixed location between the drums 51. The drums 51 are preferably tensioned as by internal coiled springs, not shown, so that the unwound portion of the tape between the drums will always be taut.

As shown, the template or pattern formation 53 is on one edge of the tape 50, and the opposite edge of the tape is provided with a continuous series of accurately formed rack teeth 54, integrally formed thereon, which mesh with a worm 55 so that longitudinal movement of the tape 50 to and from the respective drums 51, may be positively driven and accurately timed with the movement or travel of the main tool carriage 12. In the particular form shown in Fig. 4, the worm 55 is driven by a shaft 56, which runs parallel with the tape and is suitably connected by other mechanism, not shown, with either the drive means for moving the tool carriage 12 along the work bed 11 or with a suitable rack fixed to and extending lengthwise of the worktable 10.

As shown the electronic tracing head 57 which controls the operation of the cutting tool in accordance with variations in the contour 53 of the template 50, is mounted midway between the winding drums 51 and is provided with two tracer elements which ride upon the profile or template edge 53. One of these tracer elements is in the form of a stylus 58 which is shifted axially with respect to the tracing head in accordance with variations in the contour 53, and the other tracer element is in the form of a tilting tracer arm 59 that has laterally spaced roller contact elements 60 which ride upon the template edge 53 on opposite sides of the stylus 58. The tilting tracer arm 59 and its roller contact elements 60, are intended to anticipate changes in the depth of cut to be made by the cutter, and this arm 59 is, therefore, pivotally mounted and is suitably arranged for operation of electronic controls, not shown, to speed or slow the travel of the carriage 12 according to the pitch or rate of change of the contour 53 in one direction or the other.

Details of the electronic mechanism and the tracing head construction for regulating the movement of the cutter 14 in response to changes of contour of the pattern 53, are not specifically a part of this invention, but such mechanisms and means are well known in the art and are readily obtainable in the open market. These are accordingly not shown in the drawings and are claimed only broadly as an element of the novel combination.

It will be understood, however, that the tracing head 57, and the electronic control system of which it forms a part, are so arranged that the stylus 58 through its in and out or radial movement with respect to the tracer head 57, will vary the depth of the cut made by the cutter 14 in accordance with variations of the surface contour of the template 53, and simultaneously the speed of forward travel of the tool carriage 12 will be varied in response to tilting movements of the anticipator tracer 59, and in accordance with the rate of change of the contour surface 53 relative to the line of travel of the template tape. Thus while the stylus 58 will control the elevation of the cutter 14 relative to the work, in direct relation with its in and out movement relative to the tracer head 57, the anticipator tracer 59 by tilting in one direction or the other will speed up or slow the travel of the tool carriage 12 according to increase or decrease of the depth of cut which the cutter is to make in the work. It will also be understood that, according to the type of tracer head equipment that may be employed, suitable means, not shown, will be included in the control system to nullify the displacement of the stylus relative to the tracer head when the controlled cutter or tool has attained the desired position of adjustment.

As before mentioned, the cutter 14 is raised or lowered relative to the work through rotation of the nut 35 by means of the motor 37 which in turn is under the control of the tracer head control system. This causes the jack screw 34 to change the angle between the auxiliary arm 25, which remains at a constant position, and the main cutter frame arms 18.1 according to the direction and the amount of rotation of the nut 35 as it is driven by the motor 37, and such change of angle between the arms 18.1 and 25 directly controls the elevation of the cutter 14 relative to the base track 27. The change of angle between the arms 25 and 18.1 is, however, relatively small in relation to the length of the arms and, therefore, any error that might arise due to the arms being pivoted on a common center may be readily compensated for in the construction or formation of the pattern 53.

The travel of the tool carriage 12 of the milling machine along the work bed 11 is usually obtained by means of a motor mounted on the carriage structure and driving a pinion meshing directly with a rack fixed on and extending lengthwise along the worktable or machine bed. The location and arrangement of such motor, pinion and rack may vary in different milling machine constructions, and being well known in the art are, therefore, not shown in the drawings.

The main advantages of my improved milling machine construction reside in the arrangement of the shiftable cutter carrier mechanism, whereby its movements are entirely based upon and made relative to a base roller which is held in constant pressure contact with a fixed, perfectly straight and level base track, thereby providing a firm constant support for the cutter mechanism which obviates any possibility of vibration, chatter or other harmful influences from effecting accurately controlled and smooth operating engagement of the cutter with the work.

Other advantages reside in the arrangement whereby position of the cutter relative to the work is accurately and smoothly controlled by means of a positively acting jack screw arrangement operated by a remotely controlled electric motor which may be regulated by any suitable type of electronic pattern controlled mechanism wholly free from bumps, jars and other vibration effects which usually accompany positioning systems operating directly from a full scale pattern on the work bed. Still further advantages are to be found in the improved form and arrangement of pattern means which, in tape form, may be mounted directly on the operating carriage so as to be operable in positive and direct relation with the travel of the carriage along the work bed and with respect to the work mounted thereon.

Although but one specific embodiment of this invention has been herein shown and described, it will be understood that details of the construction shown may be altered or omitted without departing from the spirit of this invention as defined by the following claims.

I claim:

1. In an automatic contour milling machine, a worktable and a tool support mounted for relative travel lengthwise of said table, a track fixed with respect to said table and extending along the path of such travel, a main cutter carrier member swingable on said tool support about an axis at right angles to said path of travel, a rotary cutter journaled on said main cutter carrier member on an axis parallel with the axis of said main carrier member, a second carrier member on said tool support interposed between said main carrier member and said track and normally urged to bear continuously against said track, and jack means interposed between said carrier members for shifting one member toward and away from the other.

2. In an automatic contour milling machine, a worktable and a tool support mounted for relative travel lengthwise of said table, a track fixed with respect to said table and extending along the path of such travel, a main cutter carrier member swingable on said tool support about an axis at right angles to said path of travel, a rotary cutter journalled on said main cutter carrier member on an axis parallel with the axis of said main carrier member, a second carrier member on said tool support interposed between said main carrier member and said track and normally urged to bear continuously against said track, jack means interposed between said carrier members for shifting one member toward and away from each other, and a motor on one of said carrier members drivingly connected to actuate said jack means.

3. In an automatic contour milling machine, a worktable and a tool support mounted for relative travel lengthwise of said table, a track fixed with respect to said table and extending along the path of such travel a main cutter carrier member swingable on said tool support about an axis at right angles to said path of travel, a rotary cutter journalled on said main cutter carrier member on an axis parallel with the axis of said main carrier member, a second carrier member on said tool support interposed between said main carrier member and said track and mounted for swinging movement about the axis of said main carrier member, said second carrier member being normally urged to bear continuously against said track and jack means interposed between said carrier members for shifting one member toward and away from the other.

4. In an automatic contour milling machine, a worktable and a tool support mounted for relative travel lengthwise of said table, a track fixed with respect to said table and extending along the path of such travel, a main cutter carrier member swingable on said tool support about an axis at right angles to said path of travel, a rotary cutter journalled on said main cutter carrier member on an axis parallel with the axis of said main carrier member, a second carrier member on said tool support interposed between said main carrier member and said track and normally urged to bear continuously against said track, jack means interposed between said carrier members for shifting one member toward and away from the other, said jack means including mutually threaded shaft and nut elements respectively connected to different ones of said carrier members and one such element being rotatable relative to the other, and a motor drivingly connected to rotate such one element to actuate said jack.

5. In an automatic contour milling machine, a worktable and a tool support mounted for relative travel lengthwise of said table, a track fixed with respect to said table and extending along the path of such travel, a main cutter carrier member swingable on said tool support about an axis at right angles to said path of travel, a rotary cutter journalled on said main cutter carrier member on an axis parallel with the axis of said main carrier member, a second carrier member on said tool support interposed between said main carrier member and said track and normally urged to bear continuously against said track, jack means interposed between said carrier members for shifting one member toward and away from each other, said jack means including a shaft and a nut mutually threaded and respectively mounted on different ones of said carrier members, said nut being rotatable on its respective carrier member, an electric motor on such respective member for rotating said nut, and control means for regulating the operation of said motor.

6. In an automatic contour milling machine, a worktable and a tool support mounted for relative travel lengthwise of said table, a track fixed with respect to said table and extending along the path of such travel, a main cutter carrier member swingable on said tool support about an axis at right angles to said path of travel, a rotary cutter journaled on said main cutter carrier member on an axis parallel with the axis of said main carrier member, a second carrier member on said tool support interposed between said main carrier member and said track and normally urged to bear continuously against said track, jack means interposed between said carrier members for shifting one member toward and away from each other, said jack means comprising a threaded jack shaft extending between said carrier member and secured against axial rotation but tiltable in the plane of movement of said main carrier member, a nut threaded on said jack shaft, a bearing block for said jack shaft and nut, said block having a bore through which said jack shaft extends and thrust bearings above and below said nut, said block being swiveled on a fixed bearing on said main carrier member to permit said jack shaft to tilt in the plane of movement of said main carrier member, and a motor on said main carrier member having its shaft axially alined with the swivel bearing of said block and geared to rotate said nut.

7. In a contour milling machine, the combination of an elongated worktable, a carriage mounted to travel over work on said table, a track fixed with respect to said table and extending along the path of travel of said carriage, a rotary cutter mounted on said carriage and journaled on an axis at a right angle to said path of travel, a motor for said cutter, means on said carriage for shiftably mounting said cutter comprising one carrier member movable toward and away from said work table and on which said cutter and its motor are mounted and another carrier member adjacent the first carrier member and having a guide wheel positioned to bear on said track, jack means interposed between said carrier members to shift said movable carrier and cutter radially toward and away from the plane of said track, a motor on one of said carrier members for actuating said jack means, a longitudinally movable template tape mounted on said carriage and geared to respond to movements of the carriage along said table, said template tape having a predetermined edge contour, and control mechanism on said carriage comprising a tracer head coacting with the edge contour of said template for operating said jack actuating motor for shifting said rotary cutter radially according to variations in the contour of said template and the position of the carriage along the table.

8. In an automatic contour milling machine, a worktable and a carriage mounted for relative travel along said table, a track fixed with respect to said table and extending along the path of such travel, a main cutter carrier member swingable on said carriage about an axis at right angles to said track and parallel with the plane thereof, a cutter journaled on said main carrier member on an axis parallel to the axis of said member and movable with said member toward and away from the plane of said track, a second carrier member on said carriage swingable on the main carrier axis between said main carrier and said track and having a roller bearing on said track, jack means interposed between said members for shifting them toward and away from each other, an electric motor drivingly connected to actuate said jack means, a flexible template tape mounted on spaced rollers on said carriage and having one edge of predetermined profile, driving mechanism for said tape adapted to be actuated in accordance with the movement of said carriage along said worktable and adapted to shift said tape between said spaced rollers, and a tracing head mounted on said carriage to coact with said one edge of said tape, said tracing head being adapted to control the operation of said jack motor in direct proportion to contour changes in the template profile, and said head including a tilting profile follower adapted to vary the speed of travel of the carriage according to angular variations in the inclination of the profile of the edge of said tape.

9. In a contour milling machine, a tool carriage and horizontal worktable mounted for relative linear travel, a cutter carried by said carriage and movable in a vertical plane parallel with the line of such travel, a rigid guide track fixed on said table and extending along said line of travel, means movably mounted on said carriage for causing said cutter to shift toward and away from said work table and comprising one mounting member carrying the cutter and its motor and another mounting member disposed to engage and ride on said track and vertically movable relative to the first mounting member, jack mechanism connecting said members for movement toward and away from each other, a motor connected for actuating said jack mechanism, a template remote from the work and movable along a predetermined path, tracer mechanism coacting with said template for controlling the operation of said jack motor, and means actuated in accordance with relative movement of said carriage and worktable for shifting said template.

10. In a contour milling machine, a tool carriage and horizontal worktable mounted for relative linear travel, a cutter carried by said carriage and movable in a vertical plane parallel with the line of such travel, a guide track fixed on said table and extending along said line of travel, means movably mounted on said carriage for causing said cutter to shift toward and away from said work table and comprising one mounting member pivoted on a fixed axis on said carriage for carrying the cutter and its motor and another mounting member pivoted on the same axis and disposed to engage and ride on said track, jack mechanism operatively connecting said members for movement toward and away from each other, a motor mounted on one of said mounting members and connected for actuating said jack mechanism, a template remote from the work, tracer mechanism coacting with said template for controlling the operation of said jack motor, and means actuated in accordance with relative movement of said carriage and worktable for shifting said template relative to said tracer mechanism while said tracer is engaged therewith.

11. In an automatic milling machine having a power driven cutter movable toward and away from work to be formed, a work holding means, support means for said cutter movable along said work, and means for positioning said cutter toward and away from the work in accordance with variations in the predetermined profile of a pattern, a pattern comprising an elongate flexible tape of resilient material having a preformed profile along one edge and in the plane of the tape, a pair of laterally spaced axially parallel winding drums for said tape, and means for winding said tape from one drum to the other.

References Cited in the file of this patent

UNITED STATES PATENTS

| | | |
|---|---|---|
| 2,113,716 | Berliner | Apr. 12, 1938 |
| 2,394,671 | Duncan | Feb. 12, 1946 |
| 2,451,548 | Groen et al. | Oct. 19, 1948 |
| 2,537,770 | Livingston et al. | Jan. 9, 1951 |

FOREIGN PATENTS

| | | |
|---|---|---|
| 696,653 | Germany | Sept. 26, 1940 |